No. 729,435. PATENTED MAY 26, 1903.
A. H. SMITH.
TROLLING HOOK.
APPLICATION FILED MAR. 18, 1903.
NO MODEL.
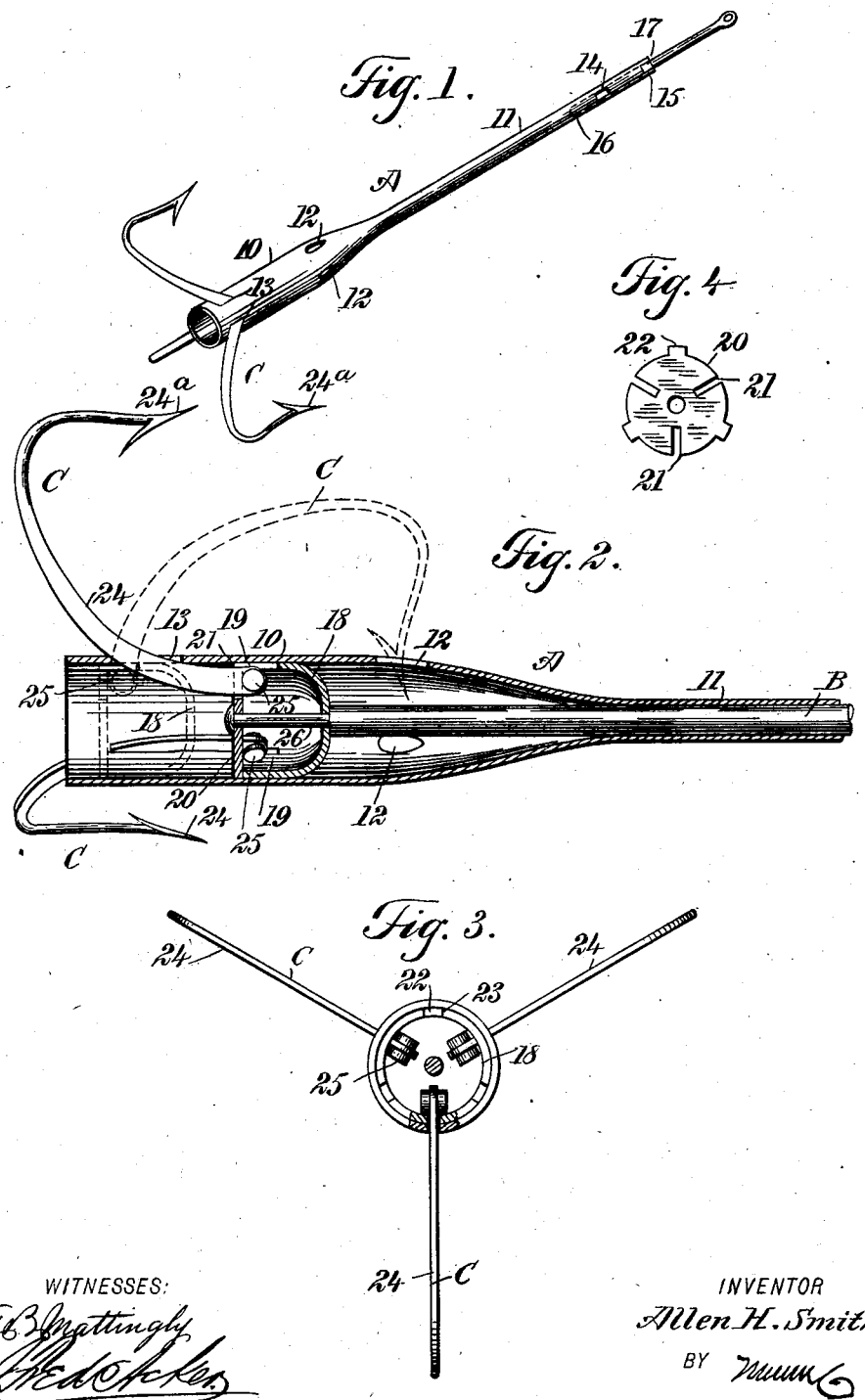
WITNESSES:
INVENTOR
Allen H. Smith
BY
ATTORNEYS.

No. 729,435. Patented May 26, 1903.

UNITED STATES PATENT OFFICE.

ALLEN H. SMITH, OF TREMONT, LOUISIANA.

TROLLING-HOOK.

SPECIFICATION forming part of Letters Patent No. 729,435, dated May 26, 1903.

Application filed March 18, 1903. Serial No. 148,387. (No model.)

*To all whom it may concern:*

Be it known that I, ALLEN H. SMITH, a citizen of the United States, and a resident of Tremont, in the parish of Lincoln and State of Louisiana, have invented a new and Improved Trolling-Hook, of which the following is a full, clear, and exact description.

The purpose of my invention is to provide a simple form of trolling-hook in which the barbs of the hook may be made to enter openings in the shank or stem when the hook is not required for use, enabling the hook to be carried in the pocket without danger or to be placed in a receptacle without the possibility of the barbs of the hooks becoming entangled with adjacent objects, and, further, to so construct the hook that the moment it is taken by the fish it will fasten itself strongly in position, but may be quickly released from the mouth of the fish without the fingers of the hand being introduced into the mouth.

A further purpose of the invention is to perfect and simplify the construction of trolling-hook for which Letters Patent were granted me October 27, 1896, No. 570,344.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of a trolling-hook constructed in accordance with my invention. Fig. 2 is an enlarged longitudinal section through the same, showing the hooks in operative position in positive lines and in closed or folded position in dotted lines. Fig. 3 is a bottom plan view of the device, partly in section; and Fig. 4 is a plan view of the bottom cap for the cup in which the shanks of the hooks are pivoted.

The body A of the hook is tubular and consists of a lower hub-section 10 and a shank-section 11 of less diameter than the hub-section 10. In the said hub-section 10 apertures 12 are produced near where the hub and shank connect, and near the lower or outer end of the said hub-section of the body corresponding longitudinal slots 13 are formed.

In the shank-section 11 of the body A, near its upper end at one side, an opening 14 is made, preferably rectangular, and a correspondingly shaped and located recess 15 is produced at the upper end of the said shank 11, while at the opposite side of the said shank-section 11 of the tubular body A a longitudinal recess 16 is made. (Shown in dotted lines in Fig. 1.)

A stem B is adapted to have sliding movement in the tubular body A, and this stem B is provided near its upper end with a rectangular pin 17, extending through from side to side, one end of which pin is adapted to travel in the slot 16 of the body, while the other end of the pin is adapted in one position of the barbs of the hooks to enter the upper recess 15 and in another position to enter the slot 14.

A cup 18, having its open end facing outward, is held to travel in the hub-section 10 of the tubular body A, as is shown in Fig. 2, and this cup 18 is provided with a series of slots 19, extending through its outer or rear edge at the open portion of the cup. The outer portion of the cup 18 is closed by means of a cap 20, (shown best in Fig. 4,) having slots 21 therein corresponding in number to and adapted to register with the slots 19 in the cup 18, as is shown in Fig. 2. The said cap 20 is also provided with marginal lugs 22, which are shown as being made to enter recesses 23 in the outer edges of the cup 18, and these lugs 22 are soldered or otherwise secured in the said recesses.

The shanks 24 of fish-hooks C, provided with the usual barbs 24ª, are made to enter the registering slots 19 and 21 in the cup 18 and its cap 20, the said shanks being axially held in the said cup by means of bosses 25, extending beyond opposite sides of the said shanks, as is shown in Figs. 2 and 3. Under this construction it will be observed that the shanks of the hooks C have pivotal movement in the cup 18.

Prior to pivoting the shanks 24 of the fish-hooks C in the cup 18 the shanks 24 of the fish-hooks are passed through the longitudinal slots 13, adjacent to the lower end of the tubular body A, as is also best shown in Fig. 2.

The stem B is utilized to impart movement to the cup 18, carrying the fish-hooks C, and therefore preferably the lower end of the stem B is reduced in diameter, as is shown at 26 in Fig. 2, and this reduced portion of the stem is passed through the said cup and through the cap 20, provided for the cup, and is headed or riveted to an engagement with the outer face of the said cap. Under this construction it will be observed that the trolling-hook may be economically and simply constructed and that when the stem B is drawn outward, so that its pin 17 enters the upper recess 15 in the tubular body A, the hooks C will be locked in position at angles to the hub-section of the tubular body, as is shown in Fig. 1. When the trolling-hook is not in use, the hook members C may be drawn upward, so that their barbs 24ª will enter the openings 12 in the hub-section 10 of the tubular body A by forcing the stem B downward until the pin 17 of the said stem has been sprung into the opening 14 in the body-section. This closed position of the hook members C is shown clearly in dotted lines in Fig. 2.

It will be observed that when the hook members C are set, as is shown in Fig. 1, and a fish takes the said hook members the barbs will fasten themselves firmly in the mouth of the fish and that when it is desired to remove the trolling-hook from the mouth of the fish it is simply necessary to force the trolling-hook as a body inwardly, thus disengaging the barbs 24ª, and before the hook is withdrawn from the mouth of the fish the stem B is forced inward, so as to carry the hook members to their closed position.

Having thus described my invention, I claim as new and desire to secure by Letters Patent—

1. The combination with a tubular body having openings therein and slots corresponding to said openings, and a stem mounted to slide in the said tubular body, of a cup secured to the stem and located within the apertured and slotted portion of the body, the said cup being provided with slots at its open end, a cap for the open end of the cup, also secured to the stem and having corresponding slots therein, and fish-hooks the shanks of which pass through the slots in the said tubular body, the inner ends of the shanks being pivoted within the said cup, extending out through the registering slots in the cup and its cap, for the purpose described.

2. In a trolling-hook, the combination of a tubular body having openings therein, a stem slidable within the tubular body, a cup secured to the said stem, made in two members having correspondingly-located slots, fish-hooks the shanks of which pass through sundry of the openings in the body and through registering slots in the members of the cup, being provided with pivot extensions within the said cup, the said hooks being carried to operative position by the movement of the stem in one direction, and being carried to the closing position by the movement of the stem in the opposite direction, as set forth.

3. The combination with a tubular body having a lower enlarged and an upper contracted section, the enlarged section being provided with slots and openings in corresponding arrangement, a stem held to slide in the said body, a cup secured to the said stem and provided with a separable cap, the cap and cup having registering slots therein, of hooks, the shank portions of which are passed through the said slots and into the said cup through the slots therein, and pivotal projections from the shanks of the hooks within the said cup, and means for locking the said stem to hold the said hooks in operative or in folded position, as set forth.

In testimony whereof I have signed my name to this specification in the presence of two subscribing witnesses.

ALLEN H. SMITH.

Witnesses:
JNO. KELL,
CHAS. CARTWRIGHT.